United States Patent [19]

Weir et al.

[11] 4,374,808

[45] Feb. 22, 1983

[54] REMOVAL OF SELENIUM FROM ACIDIC COPPER/NICKEL SOLUTIONS

[75] Inventors: Donald R. Weir; Derek G. E. Kerfoot, both of Fort Saskatchewan, Canada; Zdenek Hofirek, Rustenburg, South Africa

[73] Assignee: Sherritt Gordon Mines Limited, Toronto, Canada

[21] Appl. No.: 391,807

[22] Filed: Jun. 24, 1982

[30] Foreign Application Priority Data

Oct. 30, 1981 [CA] Canada ................................. 389144

[51] Int. Cl.$^3$ .......................... C01G 3/10; C01B 19/04
[52] U.S. Cl. ........................................ 423/42; 423/43; 423/509; 423/557; 204/108
[58] Field of Search ............... 423/508, 509, 510, 557, 423/34, 42, 43, 44; 75/117; 204/108

[56] References Cited

U.S. PATENT DOCUMENTS

| | | | |
|---|---|---|---|
| 3,914,375 | 10/1975 | Clark et al. | 423/43 |
| 3,959,097 | 5/1976 | Queneaw et al. | 423/509 |
| 3,964,901 | 6/1976 | Swinkels et al. | 423/508 |
| 4,026,797 | 5/1977 | Nikolic et al. | 423/510 |
| 4,055,630 | 10/1977 | McCoy et al. | 423/508 |
| 4,222,999 | 9/1980 | Weir et al. | 423/42 |
| 4,330,508 | 5/1982 | Weir et al. | 423/43 |

OTHER PUBLICATIONS

Zingaro, Ralph A., *Selenium*, 1974, pp. 46-56.

*Primary Examiner*—O. R. Vertiz
*Assistant Examiner*—Robert L. Stoll
*Attorney, Agent, or Firm*—Arne I. Fors; Robert F. Delbridge

[57] ABSTRACT

Selenium (IV) and selenium (VI) are removed from acidic copper-nickel sulphate solutions in a two-stage process by adjusting and maintaining the sulphuric acid content of the solution in a range of 10 to 50 g/L and, in a first stage, contacting the solution with sulphur dioxide or a sulphite-containing solution at an elevated temperature in the range of about 140° to 175° C. and, in a second stage, maintaining the said solution at an elevated temperature in the range of about 140° to 200° C. and pressure within the range of about 400 to 1750 kPa in an essentially oxygen-free atmosphere for a sufficient retention time to reduce and precipitate selenium (VI) as cuprous selenide.

11 Claims, No Drawings

REMOVAL OF SELENIUM FROM ACIDIC COPPER/NICKEL SOLUTIONS

This invention relates to the purification of copper-nickel containing leach liquors and, more particularly, relates to a process for the purification of acidic copper-nickel sulphate solutions for the removal of dissolved selenium values.

The acid leaching of copper and nickel sulphide ores, concentrates and mattes for the extraction of metal values as copper and nickel sulphates, and subsequent recovery of elemental copper and nickel, frequently results in the dissolution of selenium values present in the ores. The selenium is normally present in the leach solution as a mixture of tetravalent [Se(IV)] and hexavalent [Se(VI)] species.

Copper is generally recovered from solution by the electrowinning process in which the liquor is electrolyzed to deposit elemental copper on the cathode of an electrolytic cell. In this process selenium (IV) tends to co-deposit with the copper at the cathode, thereby contaminating the copper product. The presence of selenium in the copper product adversely affects the physical properties of the copper, and consequently it is desirable to remove substantially all the dissolved selenium (IV) values from the copper-nickel sulphate solution before the electrowinning step. In practical terms, this means that it is usually necessary to reduce the concentration of dissolved selenium (IV) values to less than about 1 milligram per liter (mg/L).

After recovery of the major part of the copper values from the copper-nickel sulphate liquor, the solution must be purified to remove residual levels of copper and iron before it can form a suitable feed to a nickel recovery process where the nickel is usually recovered in elemental form either by reduction with hydrogen, or by electrowinning. In both cases any selenium (VI) originally present in the copper-nickel sulphate liquor will remain unchanged in the solution through the copper electrowinning and the copper and iron removal stages and will report quantitatively as an impurity in the elemental nickel product. For example, a level of 5 mg/L of selenium (VI) in the leach liquor can result in as much as 50 parts per million (ppm), by weight, of selenium in the nickel powder or cathode product. In practical terms, this means that to produce a nickel of high purity it is usually necessary to reduce the concentration of dissolved selenium (VI) values to less than about 1 mg/L.

Various processes have previously been proposed for removing selenium from acidic copper-nickel sulphate solutions, but for one reason or another such known processes are not particularly suitable when the solution is to be subjected to a copper electrowinning step. For example, it is known to precipitate selenium (IV) from copper-free solutions at atmospheric pressure using sulphur dioxide or sodium sulphite as reductant. With this known process, it is difficult to reduce the dissolved selenium (IV) concentration to the low level required for the copper electrowinning step in order to produce copper which is sufficiently free from selenium. Also, this method is not normally capable of precipitating selenium (VI) except in the presence of a catalyst such as a halide or thiourea. The use of such a catalyst is very likely to contaminate the acidic copper-nickel sulphate solution and render it unsuitable for subsequent copper and nickel recovery operations.

It is also known that selenium can be precipitated from acidic copper sulphate solutions by reduction with sulphur dioxide under a pressure of from about 10 to 100 psi at a temperature of from about 110° to 170° C. and a pH of at least 3, the precipitated product being a mixture of cuprous selenide ($Cu_2Se$) and copper powder.

It is also known that selenium (VI) can be precipitated as copper selenide by treating the acidic copper sulphate solution with metallic copper powder at a temperature near the boiling point of the solution. However, to achieve a practical reaction rate, a temperature of at least about 160° C. is required.

Other known processes include the reduction of selenium (VI) to selenium (IV) at a temperature of about 225° C. with hydrogen at a partial pressure of 40-60 atmospheres. Selenium (VI) can also be removed by using nickel, cobalt or iron powder as a reducing agent at a temperature of at least about 190° C. It is also known that the selenate (VI) ion loses oxygen to form selenite (IV) when heated in acid solutions to temperatures above 200° C., thus facilitating selenium precipitation by reduction.

In all the above mentioned prior processes, it has been necessary to effect selenium (VI) removal at a high temperature in a pressure autoclave in order to achieve both a practical rate of reaction for industrial application and the low levels of selenium required for the production of high purity copper and nickel. Furthermore, when selenium is precipitated by reduction from an acidic copper-containing solution, a considerable amount of metallic copper is co-precipitated with the cuprous selenide formed by reduction of the soluble selenium species. In these cases it is necessary to selectively re-leach the selenium-containing precipitate to recover the excess copper which would otherwise represent an economic loss from the process, and to upgrade the selenium precipitate in selenium values.

Dissolved selenium (IV) values can be relatively quickly removed from an acidic aqueous copper sulphate solution by passing the solution at a temperature of about 25° to 200° C. through a reactor such as a tubular member and injecting into the solution, as the solution enters the tubular member, a selenium reducing compound selected from the group consisting of sulphur dioxide and a sulphite solution to produce a selenium-containing precipitate. With such a process, described in co-pending application Ser. No. 200,126, incorporated herein by reference, the selenium (IV) content of the solution is reduced to a satisfactory low level for copper electrowinning in a relatively short time, for example in as little as about sixty seconds.

When the acidic aqueous copper sulphate solution also contains dissolved selenium (VI) values, the presence of an excess of dissolved selenium (IV) values, preferably in a ratio of at least 3:1 of selenium (IV) to selenium (VI), results in the precipitation of a substantial portion of the selenium (VI). Although it has been found possible to reduce selenium (VI) to less than 1 mg/L in copper sulphate solutions in the presence of a sufficient quantity of selenium (IV), residual selenium (IV) values cannot be reduced below about 5 mg/L in copper-nickel sulphate solutions containing 20–40 g/L Ni.

Further, it has been found that when nickel sulphate solutions containing less than 10 g/L cupric ion are treated with sulphur dioxide or a soluble sulphite in a tubular member, a portion of the selenium (IV) may be oxidized to selenium (VI).

It is therefore an object of the present invention to provide an improved process for removing dissolved selenium (IV) and selenium (VI) values from acidic copper-nickel solutions to levels below 5 mg/L, preferably below 1 mg/L.

We have found surprisingly that both selenium (IV) and selenium (VI) can be substantially removed from aqueous acidic copper-nickel sulphate solutions by adjusting and maintaining the sulphuric acid content of said solution in the range of 10 to 50 g/L and, in a first stage, contacting said solution with sulphur dioxide or a sulphite-containing solution at an elevated temperature and, in a second stage, maintaining said solution at an elevated temperature and pressure in an essentially oxygen-free atmosphere for a sufficient retention time to reduce and precipitate selenium (VI) as cuprous selenide to obtain a final solution after cooling containing less than about 5 mg/L total selenium.

More particularly, the process of our invention for the removal of selenium (IV) and selenium (VI) from an aqueous acidic copper and nickel sulphate solution comprises the steps of adjusting and maintaining the acidity of the solution to a pH below 1 corresponding to at least 10 g/L and preferably to at least 20 g/L to 50 g/L, sulphuric acid, and in a first stage, passing the solution at a temperature in the range of about 140° to 175° C., preferably about 150° C., through a reactor and injecting into the solution in the reactor a selenium-reducing compound selected from the group consisting of sulphur dioxide and a sulphite-containing solution, and as a second stage, maintaining the resulting solution or slurry at a temperature in the range of about 140° to about 200° C., preferably about 175° C., in an essentially oxygen-free atmosphere at a pressure within the range of about 400 to about 1750 kPa, preferably about 1000 kPa, to obtain a final solution containing less than 5 mg/L total selenium and preferably less than 1 mg/L total selenium, and a precipitate consisting of cuprous selenide ($Cu_2Se$), and metallic copper.

The reactor preferably is an elongated tubular member, known as a plug-flow or pipeline reactor, which may be fabricated of an acid-resistant material such as stainless steel or plastic-lined steel. The diameter of the tubular member preferably provides a linear flow rate within the range of from about 0.5 to about 10 m/sec. A diameter within the size range of, for example, 1 to 2.5 cm, has been found satisfactory. The selenium-reducing compound normally is injected into the solution as the solution enters the reactor.

The selenium-reducing compound preferably is sulphur dioxide or a sulphite-containing solution. The sulphur dioxide may be in gaseous or liquid form or in aqueous solution and the sulphite-containing solution may be a solution of sodium sulphite or of sodium hydrogen sulphite.

The acidic copper-nickel sulphate solution, which may contain up to 90 g/L copper and up to 50 g/L nickel, normally contains 10 to 30 g/L copper and 20 to 40 g/L nickel. The selenium may be present in amounts up to about 210 mg/L selenium (IV) and up to about 70 mg/L selenium (VI).

The adjustment to and maintenance of a pH of less than 1 corresponding to at least 10 g/L and preferably at least 20 g/L up to 50 g/L sulphuric acid has been found critical in increasing the rate of precipitation of selenium (VI). In consequence, selenium (VI) precipitation can be achieved at a practical rate with a smaller concentration of reductant, and the amount of metallic copper co-precipitated with the cuprous selenide can be substantially decreased. We have found for example that a final solid precipitate from the process of our invention may contain up to about 32% by weight selenium with less than 1 mg/L total selenium remaining in the solution.

A minimum temperature of at least about 140° C., preferably a temperature at about 150° C., is desirable in the first stage of the process to provide sufficient copper in a reduced form to effect quantitative selenium (VI) precipitation in the second stage. Copper may be present in a reduced form in the solution or in the slurry entering the second stage either as dissolved cuprous ion ($Cu^+$) or as metallic copper. The reduced copper species preferably is generated in situ in the first stage by reaction of sulphur dioxide with cupric sulphate, at temperatures above about 140° C. A temperature within the range of about 140° to about 200° C. is satisfactory for the second stage with a temperature of about 175° C. preferable to provide an increased rate of selenium (VI) precipitation.

The process of our invention will now be described in conjunction with the following examples demonstrating a two-stage process wherein selenium (IV) is substantially removed in a first stage, and residual selenium (VI) is substantially removed in a second stage.

The selenium-bearing leach solution was heated under an inert atmosphere, i.e. an essentially oxygen-free atmosphere, in a stainless steel pressure vessel to the desired temperature, and the hot solution was fed therefrom through a tubular member in the form of an insulated stainless steel tube (mentioned in Example 5). The selenium-reducing compound was injected at a controlled rate into the solution stream via a T-junction at the start of the tubular member. The treated solution was continuously discharged from the end of the tubular member into a second stainless steel pressure vessel in which it was heated to the desired temperature, and maintained at that temperature for the specified retention time. The product slurry was finally discharged by flashing through a throttle valve and cooled by means of a heat exchanger. The cuprous selenide precipitate was separated from the selenium-free solution by filtration.

EXAMPLE 1

This example illustrates the effectiveness of selenium (IV) and selenium (VI) removal in a single stage process from a copper sulphate solution free of nickel values in which the selenium (IV) to selenium (VI) ratio was greater than 3:1.

Copper sulphate solution at a pH of about 4 and containing 60 g/L cupric ion was passed through the tubular member at a flow rate of 1 L/min to give a retention time of less than 60 seconds, and sodium sulphite solution was injected to provide an addition rate of 2 g/L $SO_2$. The solution contained 33.3 mg/L selenium (IV) and 9 mg/L selenium (VI) and tests were made at different temperatures ranging from 25° to 150° C. The results are shown in Table 1.

TABLE 1

| Head Solution (mg/L) | | Solution Temperature (°C.) | Final Solution (mg/L) | | Precipitation Efficiency, (%) | |
|---|---|---|---|---|---|---|
| Se(IV) | Se(VI) | | Se(IV) | Se(VI) | Se(IV) | Se(VI) |
| 33.3 | 9.0 | 25 | 0.25 | 0.26 | 99.2 | 97.1 |
| 33.3 | 9.0 | 50 | 0.30 | 0.46 | 99.0 | 94.8 |
| 33.3 | 9.0 | 100 | 0.30 | 0.75 | 99.0 | 91.7 |

TABLE 1-continued

| Head Solution (mg/L) | | Solution Temperature (°C.) | Final Solution (mg/L) | | Precipitation Efficiency, (%) | |
|---|---|---|---|---|---|---|
| Se(IV) | Se(VI) | | Se(IV) | Se(VI) | Se(IV) | Se(VI) |
| 33.3 | 9.0 | 125 | 0.30 | 1.34 | 99.0 | 85.4 |
| 33.3 | 9.0 | 150 | 0.35 | 2.10 | 98.9 | 76.7 |

In all cases, dissolved selenium (IV) values were reduced to a satisfactory low level, although the concentration of selenium (VI) was only reduced to less than 1 mg/L at temperatures of 100° C. or less.

EXAMPLE 2

This example illustrates the limitations of the single-stage process for selenium removal from copper sulphate solution in the absence of nickel values.

The tests of Example 1 were repeated with copper sulphate solution containing lower concentrations of dissolved selenium (IV) values than selenium (VI) values. In one set of tests, the solution contained 45 mg/L dissolved selenium (IV) values and 68 mg/L dissolved selenium (VI) values, and in a second set of tests the solution contained 0.15 mg/L dissolved selenium (IV) values and 113 mg/L dissolved selenium (VI) values. The results are shown in Table 2.

TABLE 2

| Head Solution (mg/L) | | Solution Temperature (°C.) | Final Solution (mg/L) | | Precipitation Efficiency, (%) | |
|---|---|---|---|---|---|---|
| Se(IV) | Se(VI) | | Se(IV) | Se(VI) | Se(IV) | Se(VI) |
| 45 | 68 | 25 | 0.13 | 52 | 99.7 | 23.5 |
| 45 | 68 | 50 | 0.13 | 52 | 99.7 | 23.5 |
| 45 | 68 | 100 | 0.13 | 53 | 99.7 | 22.0 |
| 45 | 68 | 125 | 0.15 | 53 | 99.6 | 22.0 |
| 45 | 68 | 150 | 0.15 | 52 | 99.6 | 23.5 |
| 0.15 | 113 | 25 | 0.15 | 105 | — | 9.7 |
| 0.15 | 113 | 50 | 0.15 | 101 | — | 9.7 |
| 0.15 | 113 | 100 | 0.15 | 101 | — | 10.6 |
| 0.15 | 113 | 125 | 0.15 | 99 | — | 12.4 |
| 0.15 | 113 | 150 | 0.15 | 103 | — | 8.8 |

It will be noted that although the dissolved selenium (IV) concentration was reduced to less than 1 mg/L, only minor amounts of selenium (VI) were precipitated.

As indicated earlier it has been found that where selenium (VI) values are also present, it is necessary that the ratio of dissolved selenium (IV) values to dissolved selenium (VI) values be at least 3:1 in order to achieve reduction of the concentration of dissolved selenium (VI) values to a satisfactory low level in the single-stage process.

EXAMPLE 3

This example illustrates the limitations of the single-stage process for selenium removal from copper sulphate solutions which contain substantial concentrations of nickel values.

Tests were carried out as described in Example 1 using solution containing 60 g/L cupric ion and 38 g/L nickel ion, and varying levels of selenium (IV) and selenium (VI) values, at 120° C. The results are shown in Table 3.

TABLE 3

| Head Solution | | | | | Solution Temperature (°C.) | Final Solution (mg/L) | |
|---|---|---|---|---|---|---|---|
| (g/L) | | | (mg/L) | | | | |
| Ni | Cu | $H_2SO_4$ | Se(IV) | Se(VI) | | Se(IV) | Se(VI) |
| 38 | 60 | 20 | 77 | 8 | 120 | 0.20 | 5.3 |
| 38 | 60 | 20 | 87 | 25 | 120 | 0.16 | 5.2 |
| 38 | 60 | 20 | 83 | 15 | 120 | 0.12 | 5.8 |

It will be noted that even though the ratio of selenium (IV) to selenium (VI) values was greater than 3:1 in each case, the concentration of selenium (VI) was not reduced below 5 mg/L. It is believed that in the presence of dissolved nickel ions, some oxidation of selenium (IV) to selenium (VI) occurs when the selenium-containing solution is treated with sulphur dioxide or a soluble sulphite in a tubular member, resulting in significant residual levels of dissolved selenium (VI) values.

EXAMPLE 4

This example illustrates the effect of temperature and sulphuric acid concentration on the rate of selenium (VI) precipitation in the second stage of the two-stage process of this invention. Copper-nickel sulphate solutions containing about 100 mg/L selenium (VI) with increasing levels of sulphuric acid, but from which the selenium (IV) values had been removed to less than 1 mg/L, were contacted with metallic copper powder in a pressure vessel at a temperature of either 150° C. or 175° C. Table 4 details the retention time necessary to reduce the dissolved selenium content to less than 1 mg/L under each set of conditions.

TABLE 4

| Temperature (°C.) | $H_2SO_4$ (g/L) | Retention Time (min) |
|---|---|---|
| 150 | 10 | >120 |
| 150 | 20 | 60 |
| 150 | 50 | 30 |
| 150 | 100 | >120 |
| 175 | 10 | 45 |
| 175 | 20 | <30 |

These data illustrate the significantly higher rate of selenium (VI) precipitation from copper-nickel solutions containing 20 to 50 g/L sulphuric acid. It is also apparent that the rate of selenium (VI) precipitation more than doubles when the solution temperature is increased from 150° to 175° C.

EXAMPLE 5

This example illustrates a two-stage process consisting of a first-stage selenium (IV) removal and a second-stage selenium (VI) removal. A 60 liter charge of leach liquor contained 60 g/L copper, 30 g/L nickel, 10 g/L sulphuric acid, 123 mg/L selenium (IV) and 40 mg/L selenium (VI) was preheated to 135° C. and passed through a tubular plug flow reactor 30 m long × 9.5 mm outside diameter at a rate of 5 L/min, where it was treated with an aqueous solution of sulphur dioxide at a rate corresponding to 5 g/L $SO_2$ in the leach solution. A filtered sample of solution taken from the end of the tubular reactor contained 2 mg/L selenium (IV) and 25 mg/L selenium (VI).

After treatment with sulphur dioxide in the tubular reactor the process solution, with no intermediate filtration or cooling, was heated to 175° C. in an agitated vertical autoclave, and maintained at that temperature and at a pressure of about 1000 kPa for 60 min. A filtered solution sample taken from the autoclave at this point contained 0.1 mg/L selenium (IV) and 10 mg/L selenium (VI).

The solution was discharged from the autoclave and cooled to ambient temperature by means of a heat exchanger. The cooled solution, after removal of the solid precipitate by filtration, contained <0.1 mg/L selenium (IV) and 4 mg/L selenium (VI).

The precipitate recovered from the discharge slurry contained 31.8% selenium and 59.9% copper, representing about 90% cuprous selenide and only about 10% metallic copper.

EXAMPLE 6

A 60 liter charge of leach liquor containing 70 g/L copper, 30 g/L nickel, 10 g/L sulphuric acid, 73 mg/L selenium (IV) and 11 mg/L selenium (VI) was preheated to 150° C. and passed through the tubular plug-flow reactor described in Example 5, where it was treated with 5 g/L $SO_2$ in leach solution. A filtered sample of solution taken from the end of the tubular reactor contained <0.1 mg/L selenium (IV) and 4.8 mg/L selenium (VI).

The treated solution was heated without intermediate cooling to 175° C. in the vertical autoclave and maintained at this temperature for 60 min. A filtered solution sample taken from the autoclave after 60 min. contained less than 0.5 mg/L total selenium (IV) and selenium (VI).

The slurry was discharged from the autoclave and cooled to ambient temperature. The final solution contained less than 0.5 mg/L total selenium and the solid precipitate analysed 5.7% selenium and 77.9% copper representing about 18% cuprous selenide and 82% metallic copper.

In two further tests under the same conditions the treated solutions contained less than 0.5 mg/L total selenium in each case, and the residues contained 10.6% selenium, and 13.6% selenium, respectively.

What we claim as new and desire to protect by Letters Patent of the United States is:

1. A process for the removal of selenium (IV) and selenium (VI) from an aqueous acidic copper and nickel sulphate solution comprising the steps of adjusting and maintaining the sulphuric acid content of said solution in the range of 10 to 50 g/L and, in a first stage, contacting said solution with a selenium-reducing compound selected from the group consisting of sulphur dioxide and a sulphite-containing solution at an elevated temperature for substantial precipitation of selenium (IV) and, in a second stage, maintaining said solution at an elevated temperature and pressure in an essentially oxygen-free atmosphere for a sufficient retention time to reduce and precipitate selenium (VI) as cuprous selenide to obtain a final solution after cooling containing less than 5 mg/L total selenium.

2. A process as claimed in claim 1 in which the solution is maintained at a temperature in the range of about 140° to 175° C. in the first stage and the solution is maintained at a temperature in the range of about 140° to about 200° C. in the second stage.

3. A process for the removal of selenium (IV) and selenium (VI) from an aqueous acidic copper and nickel sulphate solution comprising the steps of adjusting and maintaining the acidity of the solution to a pH below 1 corresponding to at least 10 g/L sulphuric acid and, as a first stage, passing the solution at a temperature in the range of about 140° to 175° C. through a reactor and injecting into the solution in the reactor a selenium-reducing compound selected from the group consisting of sulphur dioxide and a sulphite-containing solution for the substantial precipitation of selenium (IV), and as a second stage, maintaining the resulting solution or slurry at a temperature in the range of about 140° to about 200° C. in an essentially oxygen-free atmosphere at a pressure within the range of about 400 to about 1750 kPa to obtain a final solution containing less than 5 mg/L total selenium and a precipitate consisting of cuprous selenide ($Cu_2Se$), and metallic copper.

4. A process as claimed in claim 3 in which the solution is maintained at a temperature of about 150° C. in the first stage.

5. A process as claimed in claim 3 in which the solution is maintained at a temperature of about 150° C. in the first stage and at a temperature of about 175° C. in the second stage, to obtain a final solution after cooling containing less than 1 mg/L total selenium.

6. A process as claimed in claim 5 in which the acidity of the solution is adjusted and maintained at a pH below 1 corresponding to at least 20 to 50 g/L sulphuric acid.

7. A process as claimed in claim 3, 4 or 5 in which the reactor through which the solution is passed in the first stage is a tubular member.

8. A process as claimed in claim 3, 4 or 5 in which the reactor through which the solution is passed in the first stage is a tubular member and the selenium-reducing compound is injected into the solution as the solution enters the tubular member.

9. A process as claimed in claim 3, 4 or 5 in which the reactor through which the solution is passed in the first stage is a tubular member and the selenium-reducing compound is injected into the solution as the solution enters the tubular member, said solution having a retention time in the tubular member of less than 60 seconds and a retention time in the second stage of less than 60 minutes.

10. A process as claimed in claim 3 in which the sulphur dioxide is liquid or gaseous sulphur dioxide, or aqueous sulphur dioxide solution, and the sulphite-containing solution is a solution of sodium sulphite or sodium hydrogen sulphite.

11. A process as claimed in claim 3 in which the acidic copper and nickel sulphate solution contains at least about 20 g/L dissolved nickel and at least about 10 g/L dissolved copper.

* * * * *